US006668375B1

(12) United States Patent
Leovac

(10) Patent No.: US 6,668,375 B1
(45) Date of Patent: Dec. 23, 2003

(54) METHOD AND SYSTEM FOR PROVIDING BUILD-TO-ORDER SOFTWARE APPLICATIONS

(75) Inventor: Dino Leovac, Allison Park, PA (US)

(73) Assignee: Pitney Bowes Inc., Stamford, CT (US)

(*) Notice: Subject to any disclaimer, the term of this patent is extended or adjusted under 35 U.S.C. 154(b) by 0 days.

(21) Appl. No.: 09/461,853

(22) Filed: Dec. 15, 1999

(51) Int. Cl.[7] ............................................. G06F 9/445
(52) U.S. Cl. ..................... 717/174; 717/175; 717/176; 717/177; 717/178; 717/168; 717/173; 705/51; 705/64; 380/286; 707/100; 707/203
(58) Field of Search ................................. 717/174–178, 717/168–171; 707/213, 100, 203; 380/286; 705/64, 51

(56) References Cited

U.S. PATENT DOCUMENTS

| | | | | |
|---|---|---|---|---|
| 5,247,683 A | * | 9/1993 | Holmes et al. .............. 709/221 |
| 5,572,652 A | | 11/1996 | Robusto et al. ............. 395/326 |
| 5,675,649 A | * | 10/1997 | Brennan et al. ............. 380/286 |
| 5,696,825 A | | 12/1997 | Johnson et al. ............... 380/25 |
| 5,696,827 A | | 12/1997 | Brands .......................... 380/30 |
| 5,696,980 A | | 12/1997 | Brew .......................... 395/752 |
| 5,708,715 A | | 1/1998 | Vicard .......................... 380/25 |
| 5,717,930 A | | 2/1998 | Imai et al. .................. 395/712 |
| 5,745,896 A | * | 4/1998 | Vijaykumar ................. 707/100 |
| 5,748,940 A | | 5/1998 | Angelo et al. .............. 395/490 |
| 5,758,154 A | | 5/1998 | Qureshi ....................... 395/651 |
| 5,805,897 A | | 9/1998 | Glowny ....................... 395/712 |
| 5,815,657 A | | 9/1998 | Williams et al. ............. 395/186 |
| 5,860,012 A | * | 1/1999 | Luu ............................. 717/175 |
| 5,881,236 A | * | 3/1999 | Dickey ........................ 709/221 |
| 5,931,909 A | * | 8/1999 | Taylor ......................... 709/221 |
| 5,982,892 A | * | 11/1999 | Hickes et al. ................. 705/51 |
| 5,991,543 A | * | 11/1999 | Amberg et al. ............. 717/175 |
| 6,023,586 A | * | 2/2000 | Gaisford et al. ............. 717/178 |
| 6,029,150 A | * | 2/2000 | Kravitz ......................... 705/39 |
| 6,067,622 A | * | 5/2000 | Moore .......................... 713/200 |
| 6,256,668 B1 | * | 7/2001 | Slivka et al. ................ 709/220 |
| 6,256,773 B1 | * | 7/2001 | Bowman-Amuah ......... 717/121 |
| 6,269,377 B1 | * | 7/2001 | Collie et al. ................. 707/103 |
| 6,282,712 B1 | * | 8/2001 | Davis et al. ................. 717/170 |
| 6,327,706 B1 | * | 12/2001 | Amberg et al. ............. 717/174 |
| 6,347,397 B1 | * | 2/2002 | Curtis .......................... 717/170 |
| 6,353,926 B1 | * | 3/2002 | Parthesarathy et al. ..... 717/170 |
| 6,367,072 B1 | * | 4/2002 | Justice et al. ................ 717/168 |
| 6,381,742 B2 | * | 4/2002 | Forbes et al. ................ 717/170 |
| 6,424,717 B1 | * | 7/2002 | Pinder et al. ................ 380/239 |
| 6,460,023 B1 | * | 10/2002 | Bean et al. ..................... 705/54 |
| 6,598,223 B1 | * | 7/2003 | Vrhel et al. .................. 717/174 |
| 6,615,404 B1 | * | 9/2003 | Garfunkel et al. ........... 717/173 |
| 6,615,405 B1 | * | 9/2003 | Goldman et al. ............ 717/174 |

FOREIGN PATENT DOCUMENTS

| | | | | |
|---|---|---|---|---|
| EP | 0 809 182 A1 | 11/1997 | ............ G06F/9/445 |
| WO | WO 92/09160 | 5/1992 | .............. H04L/9/00 |
| WO | WO 00/58830 | 10/2000 | ............ G06F/9/445 |

OTHER PUBLICATIONS

Title: Public protection of software, author: Herzberg et al, ACM, 1987.*
Title: Meeting the Needs (and Preferences) of a Diverse World Wide Web Audience, author: Hysell, ACM, 1998.*

* cited by examiner

*Primary Examiner*—Chameli C. Das
(74) *Attorney, Agent, or Firm*—Charles R. Malandra, Jr.; Angelo N. Chaclas

(57) ABSTRACT

A system and corresponding method for unlocking options in already installed software. The software is provided with all of the options on an installation medium and when the software is first received only a basic version is installed. The options are requested by a user and the customer service system provides a key based on information about the user and about the options requested. The installation software constructs a key from the same information and compares the key received from customer service. If the keys match, the requested options are installed.

9 Claims, 3 Drawing Sheets

METHOD AND SYSTEM FOR PROVIDING BUILD-TO-ORDER SOFTWARE APPLICATIONS

FIELD OF THE INVENTION

The present invention pertains to the field of installing software, and more particularly to providing new options to already installed software.

BACKGROUND

Sometimes a software application is provided to a customer in a configuration that includes only basic features, i.e. a basic build, and the customer is able to request that additional features be activated. In some instances, the additional features are provided on an installation medium along with the basic build, but are not installed with the basic build. This procedure, having the customer install a base version and then later request that options be installed from the installation medium already provided, eliminates the need of providing to each customer a potentially different configuration, i.e. a basic build with potentially different installed options, and also eliminates having to provide an entirely new build (with a new set of options) each time a customer wants to take advantage of different or additional options.

In what has been described, there is nothing to stop a customer from installing any option the customer would like, even though the customer might only have paid for some of the options, or none at all. All of the options are provided to the customer on an installation medium, but simply not installed. What is needed is a way to allow provision of all the options to a customer with a base version (basic build), but to prevent the customer from installing options not paid for, and allowing a customer to install only those options requested and paid for.

SUMMARY OF THE INVENTION

Accordingly, the present invention provides a method and corresponding system for installing a software option for a software application already installed on a customer computer system. The option is included on an installation medium provided for use with the customer system, which includes an installation module. The software application is registered with customer service via a customer service system, and the registration information, provided to customer service, is stored also on the customer system, the method including the following steps performed on the customer system. The steps include receiving from a user an indication of the option to be installed; constructing, from elements of the registration information, a system identification uniquely identifying to the customer service system the application for which the option is to be installed; and construction of an order alteration request from the system identification and from the option indicated to be installed. Additionally, the steps include communication of the order alteration request to the customer service system, and receiving a key, from the customer service system, which is computed by hashing the predetermined elements of the order alteration request. A confirmatory key is then computed by hashing the predetermined elements of the order alteration request and comparing the key to the confirmatory key, and installing the option only if the key is the same as the confirmatory key.

In some aspects of the invention the customer service system performs the following steps: receiving the order alteration request and verifying the order using the system identification; checking the order for consistency, and in particular for whether some options already installed should be deleted for the software application to function properly; computing the key; and providing the key to the customer service.

Preferably, the key is computed using the secure hash algorithm (SHA). However, any reasonably secure hashing algorithm can be used in the method of the present invention to compute the key.

In some aspects of the present invention, the system identification also includes an indication of the time the order alteration request was prepared by the customer system.

BRIEF DESCRIPTION OF THE DRAWINGS

The above and other features and advantages of the invention will become apparent from a consideration of the subsequent detailed description presented in connection with accompanying drawings, in which.

DETAILED OF THE PREFERRED EMBODIMENT

Figure 1:
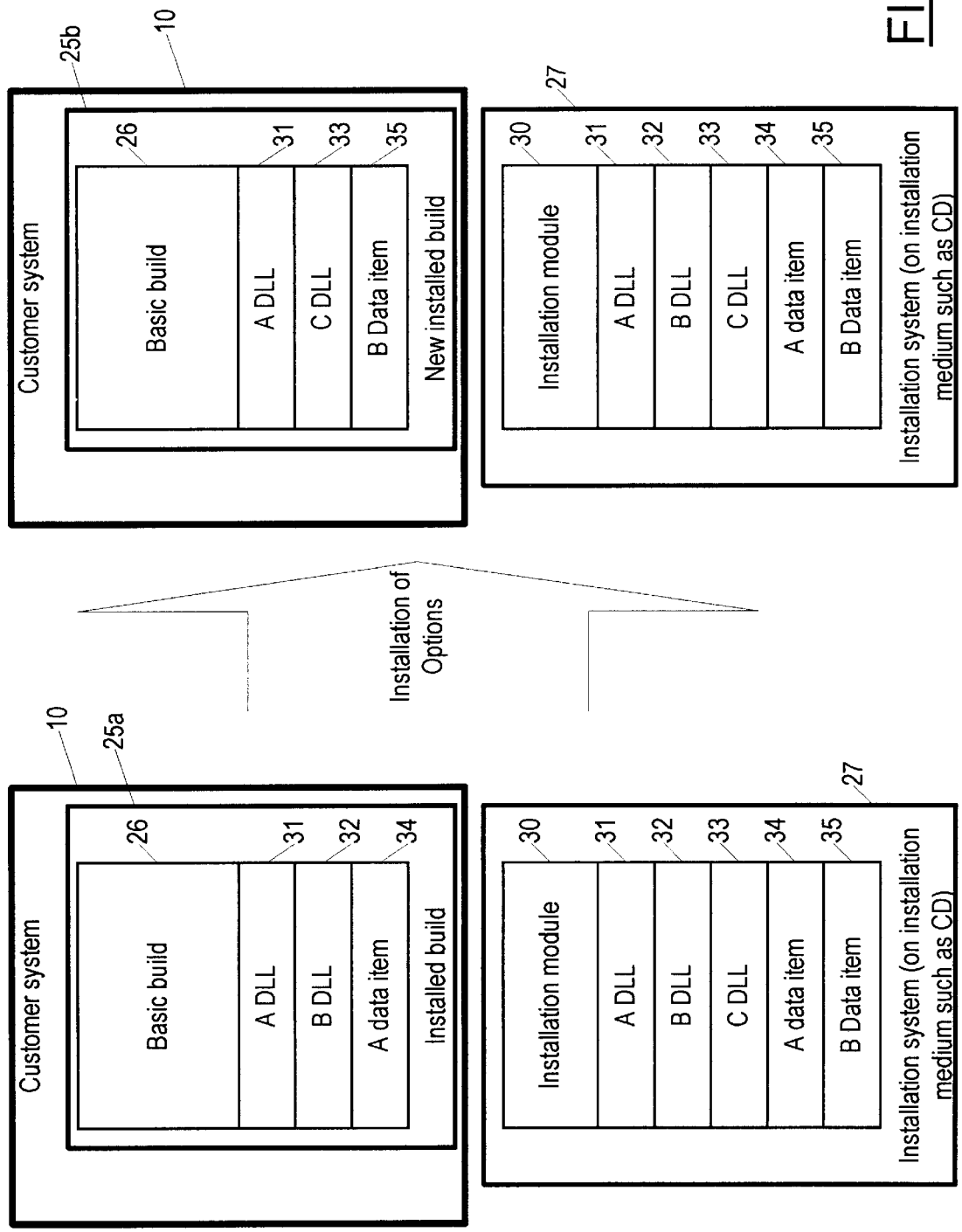
FIG. 1 is a schematic diagram showing a before and after of an installed software application consisting of a basic build and a set of installed options.

Referring now to FIG. 1, according to the present invention, once a customer system 10 has installed on it a software application 25a consisting of a basic build 26, and possibly some options 31 32 34, the customer (not shown) can use the customer system 10 to request that a customer service system (see FIGS. 2 and 3) enables installing additional or different options 31 33 35. In the preferred embodiment, the operating system hosting the software application 25a allows the use of executable code that can be dynamically linked (at "run time") to other executable code. For example, the Microsoft Windows operating systems allow the use of dynamic-link-library (DLL) code. Regardless of whether DLLs per se are permitted by the host operating system, the options to be installed by the present invention are usually in the form of executable code 31–33 dynamically linkable to the basic build, and also in the form of data items 34–35.

The installation of options proceeds by loading into RAM (not shown) of the customer system an installation module 30 from an installation medium 27, such as a compact disc. Once in RAM, the installation module 30 copies onto the customer system whatever new options 33 35 have been validly requested, as described below, and eliminates all options the customer has indicated are to be removed, or options determined to be inconsistent with the new options as described below.

Figure 2:
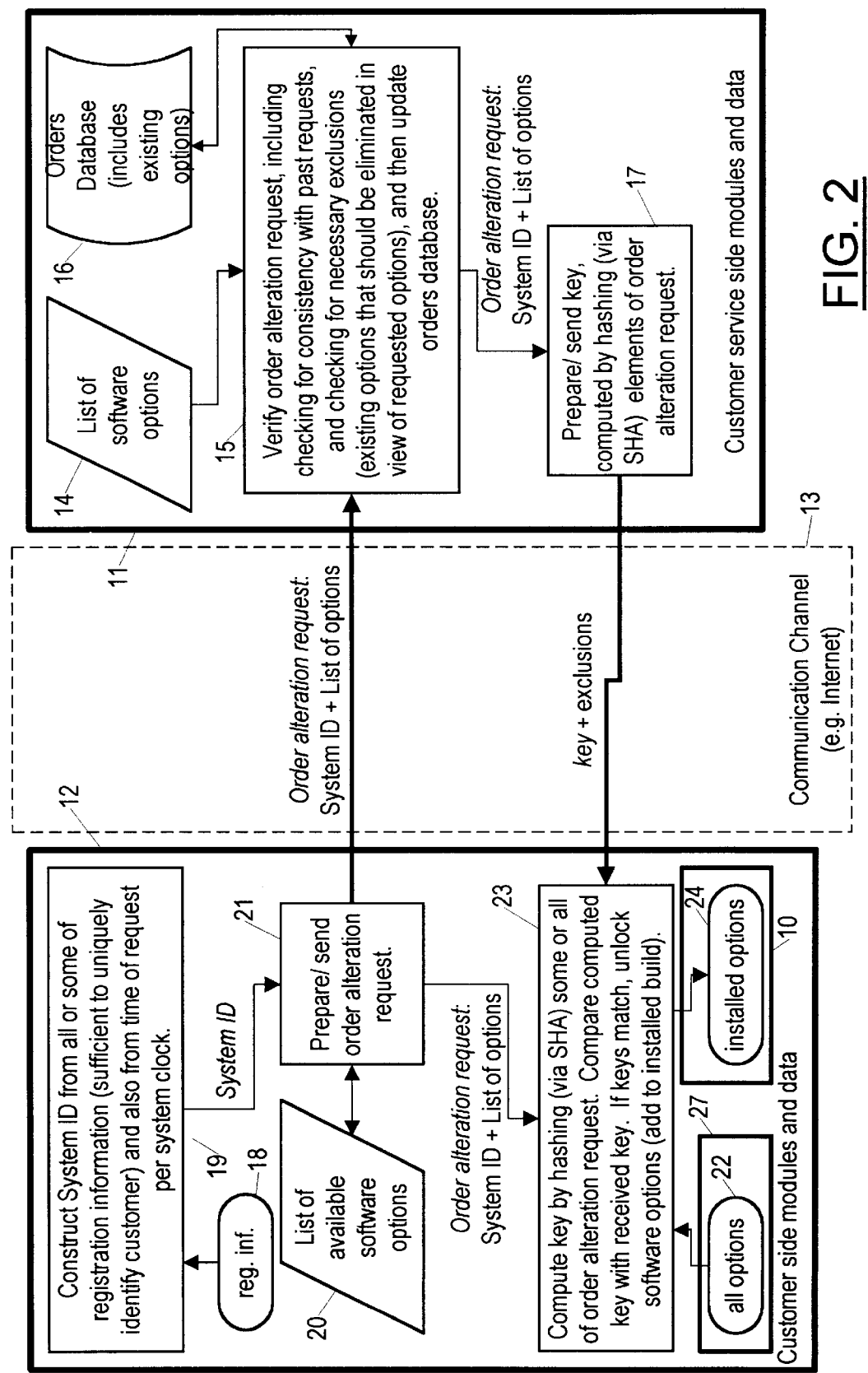
FIG. 2 is a flow chart showing how different options are installed on a customer system.

Referring now to FIG. 2, according to the present invention, to install a different set of options than the set of options already installed, the customer first loads the installation module 30 (see FIG. 1) from the installation medium 27 into RAM of the customer system 25. When the installation module 30 runs, in a step 21 the customer indicates the options the customer would like, selecting the options from a list of options 20. Then in a step 19, the installation module 30 constructs a system identification, using enough of the registration information (the customer is assumed to have registered the software application with customer service) to uniquely identify the customer to customer service. In addition, the installation module encodes the time of request in the system identification. The time of request is determined by referring to the system clock on the customer system and is used as a starting time for an interval in which the request would be considered valid by customer service. Beyond the interval, customer service will disallow the request. In the preferred embodiment, the interval is short enough that it is physically nearly impossible for a customer to transfer the constructed system identification to another customer system and have that customer system also make a request for additional options.

The installation module then, in a step 21, builds an order alteration request, including the system identification and a list of the options selected by the customer. In the same step 21, the installation module sends the order alteration request to customer service over a communication channel 13, such as the Internet. On the customer service side, in a step 15, the customer system verifies the order alteration request using a list of options 14. The verification includes checking the request for consistency with existing options. It checks for consistency by referring to an orders database 16, using the system identification as an index, to determine the options already in place on the customer system. As part of the consistency check, the customer service system checks for any exclusions of options that are required based on the options the customer would like and the options already in place. The exclusions are those options that must be eliminated, because of the new options requested, for the application to work properly.

In a step 17, if the order alteration request is valid if i.e. if the customer is a valid customer according to the system identification customer service then prepares and sends to the customer a key to unlock the requested options. The key is computed, in the preferred embodiment, by hashing predetermined elements of the order alteration request using the secure hash algorithm (SHA), as specified in Federal Information Processing Standards publication (FIPS PUB) 180-1, dated Apr. 17, 1995, or any later version. This standard is used because it provides a key of constant length (160 bits) for a message of a length less than $2^{64}$ bits. The present invention however should not be understood to be limited to the use of SHA for providing a key to unlock the options. Any reasonably secure hash algorithm is suitable for use in unlocking options according to the present invention. In the preferred embodiment, a single key is used to unlock all of the consistent options of any order alteration request.

When the installation module 30 receives the key from customer service, along with any exclusions, in a step 23 it also computes a confirmatory key by hashing the same predetermined elements of the order alteration request, using the same predetermined hash algorithm, which in the preferred embodiment is SHA as indicated above. The installation module then compares the key it calculated (the confirmatory key) with the key it received. If the keys match, the installation module unlocks the options requested, i.e. it copies the requested options from a file of options 22 on the installation medium 27 onto the customer system as installed options 24, and it eliminates from the customer system any exclusions.

Figure 3:
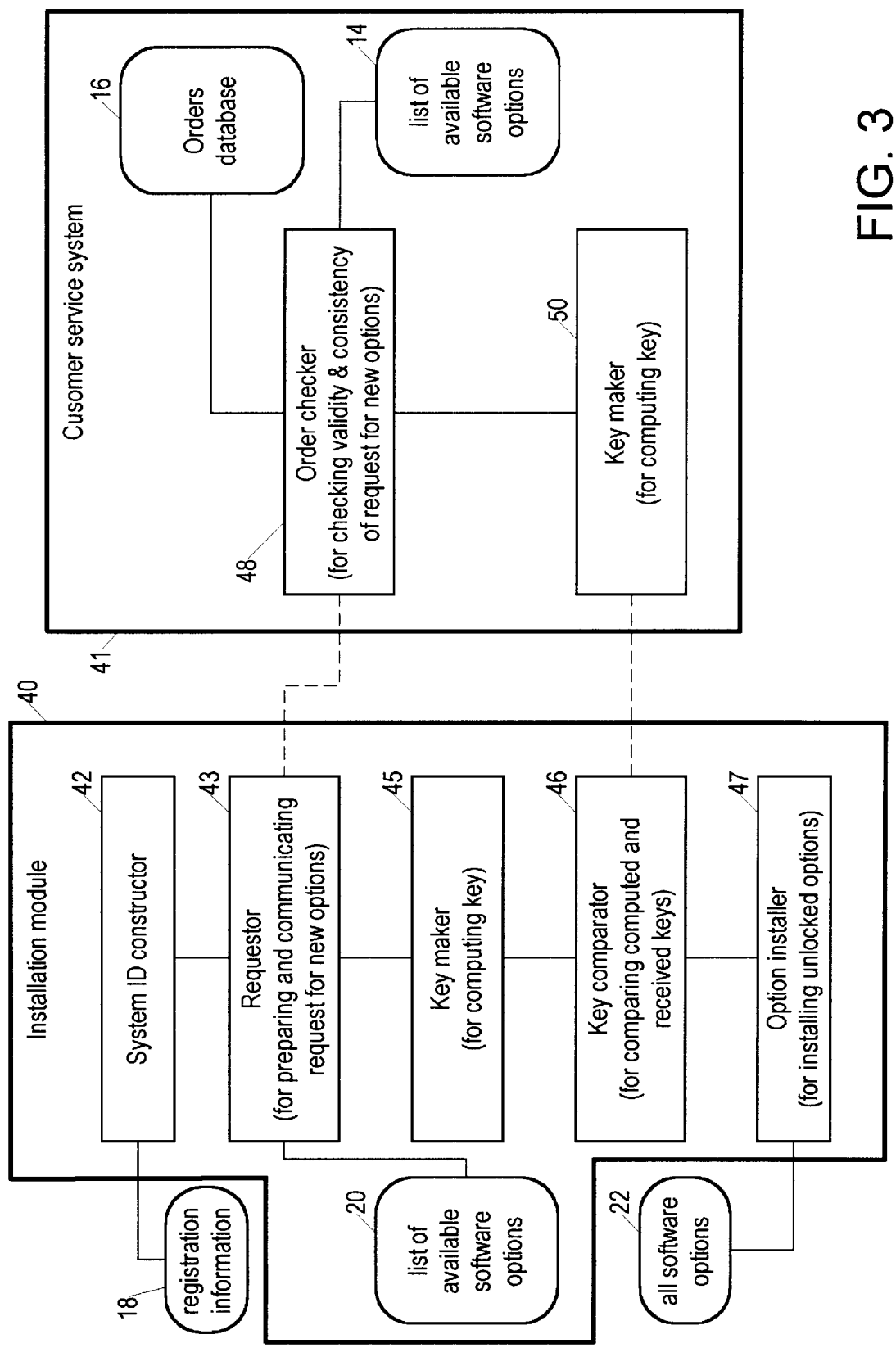
FIG. 3 is a block diagram showing components of the installation module used by a customer to install new options, and showing elements of the customer service module that interface with the installation module to allow a user to install different options.

Referring now to FIG. 3, individual task modules 42–47 of the installation module 30 (FIG. 1) are shown along with the individual task modules of the customer service system 41. The installation module 30 includes a system identification constructor, for constructing the system identification from elements of the registration information 18 stored on the customer system. It also includes a requestor 43 for preparing and communicating a request for new options. The requestor 43 makes available to the user a list of the available software options 45 from which the customer can make a selection. The installation module 30 further includes a key maker 45 for computing a key based on elements of the system identification and the requested options communicated by the requester 43. The installation module also includes a key comparator 46, which receives from the customer service module a key computed by the customer service system compares the key with the confirmatory key computed by the key maker 45, and determines whether the keys are the same. Finally, the installation module 30 includes an option installer 47, which is called by the key comparator 46 only if the keys in fact are the same. The option installer then selects from the installation medium those options to install from among all software options 22 that are stored on the installation medium 27.

On the customer service side, the customer service system 41 is shown as including an order checker 48 for checking the consistency of a request for new options received from the customer installation module 30. The order checker 48 uses an orders database 16 and a list of available software options 20 to check for consistency of the request. The order checker then calls a customer service system key maker 50 and provides it with the information it needs to compute a key corresponding to the request for new options, as well as providing it with any exclusions that are required by the requested options.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

What is claimed is:

1. A method for installing a software option for a software application that has been previously installed on a system, the software option being included on an installation medium that includes an installation module, the software application having been registered with a customer service registry, the method comprising the steps of:

receiving from a user an indication of the software option to be installed on the system;

constructing, from elements of the customer service registry, system identification information that uniquely identifies the software application for which the software option is to be installed;

constructing an order alteration request as a function of the system identification information and the software option that was indicated to be installed;

providing the order alteration request to the customer service registry;

receiving, from the customer service registry, a key that is computed by the customer service registry by hashing predetermined elements of the order alteration request;

computing a confirmatory key by hashing the predetermined elements of the order alteration request; and comparing the key to the confirmatory key, and installing the software option if the key is the same as the confirmatory key.

2. The method of claim 1, further comprising:

verifying the order alteration request using the system identification information; and checking the order alteration request for consistency.

3. The method of claim 1, wherein the system identification information includes an indication of the time the order alteration request was constructed.

4. A system for installing a software option for a software application that was previously installed on a customer system the system comprising:

an installation module, responsive to an indication by a customer of a software option to be installed, for providing an order alteration request indicating the software application for which the software option is to be installed and indicating the software option, and for computing a confirmatory key by hashing predetermined elements of the order alteration request according to a predetermined hash algorithm, responsive to a key, for installing the indicated option if the key is the same as the confirmatory key; and a customer service module, responsive to the order alteration request, for confirming the order alteration request, and for providing a key, computed by hashing the predetermined elements of the order alteration request according to a predetermined algorithm.

5. The system of claim 4, wherein the customer service module further provides an indication of any software options previously installed that are to be un-installed, and wherein the installation module is responsive to the software options that are to be un-installed and un-installs the software options if the confirmatory key matches the key received from the customer service module.

6. The system of claim 5, further comprising an indication of the time the order alteration request was prepared.

7. The system of claim 5, wherein the predetermined hash algorithm is the Secure Hash Algorithm (SHA).

8. A method for installing a software option for a software application that has been previously installed on a customer system, the software option being included on an installation medium having been provided for use with the customer system, the method comprising steps of:

providing an order alteration request identifying a customer to a customer service registry and indicating at least one software option to be installed;

computing a key by hashing predetermined elements of the order alteration request, and providing the key to the customer system; and computing a confirmatory key and installing the indicated at least one software option when the confirmatory key matches the key received from customer service.

9. A method as in claim 8, further comprising the steps of having the customer service registry check for any software options that should be un-installed based on at least one software option indicated to be installed, and providing the customer system an indication of the options that should be un-installed.

* * * * *